No. 638,830. Patented Dec. 12, 1899.
G. S. & W. K. BAKER.
WHISKING OR MIXING MACHINE.
(Application filed Dec. 31, 1897.)
(No Model.) 8 Sheets—Sheet 1.

Witnesses.
Thomas Durant
Jno. B. Peyton, Jr.

Inventors:
George S. Baker
William K. Baker
By Church & Church
their Attorneys.

No. 638,830. Patented Dec. 12, 1899.
G. S. & W. K. BAKER.
WHISKING OR MIXING MACHINE.
(Application filed Dec. 31, 1897.)
(No Model.) 8 Sheets—Sheet 3.

No. 638,830. Patented Dec. 12, 1899.
G. S. & W. K. BAKER.
WHISKING OR MIXING MACHINE.
(Application filed Dec. 31, 1897.)
(No Model.) 8 Sheets—Sheet 5.

No. 638,830. Patented Dec. 12, 1899.
G. S. & W. K. BAKER.
WHISKING OR MIXING MACHINE.
(Application filed Dec. 31, 1897.)
(No Model.) 8 Sheets—Sheet 7.

Witnesses:
Inventors:
George S. Baker and
William K. Baker
by Church & Church
their Attorneys.

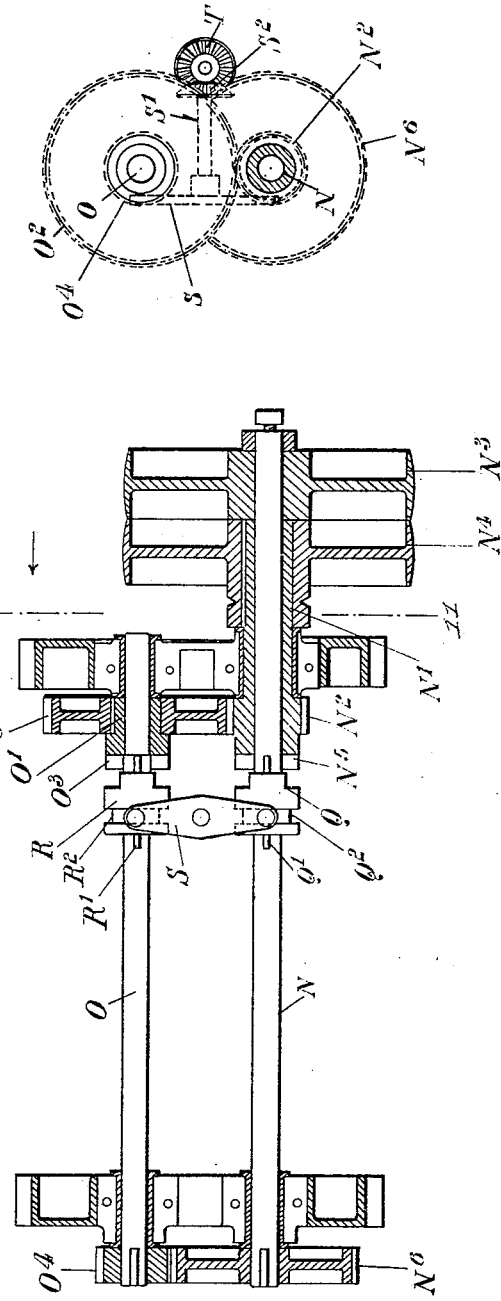

UNITED STATES PATENT OFFICE.

GEORGE SAMUEL BAKER AND WILLIAM KING BAKER, OF LONDON, ENGLAND.

WHISKING OR MIXING MACHINE.

SPECIFICATION forming part of Letters Patent No. 638,830, dated December 12, 1899.

Application filed December 31, 1897. Serial No. 665,159. (No model.)

*To all whom it may concern:*

Be it known that we, GEORGE SAMUEL BAKER and WILLIAM KING BAKER, subjects of the Queen of England, residing at London, England, have invented certain new and useful Improvements in Whisking or Mixing Machines, (for which we have obtained Letters Patent in Great Britain, No. 20,972, dated November 4, 1893,) of which the following is a specification.

This invention relates to whisking or mixing machines; and it has for its object to improve their construction and permit of the whisks being readily removed from the machine and as readily replaced in position.

The invention will be best understood by reference to the accompanying drawings, in which—

Figure 1:
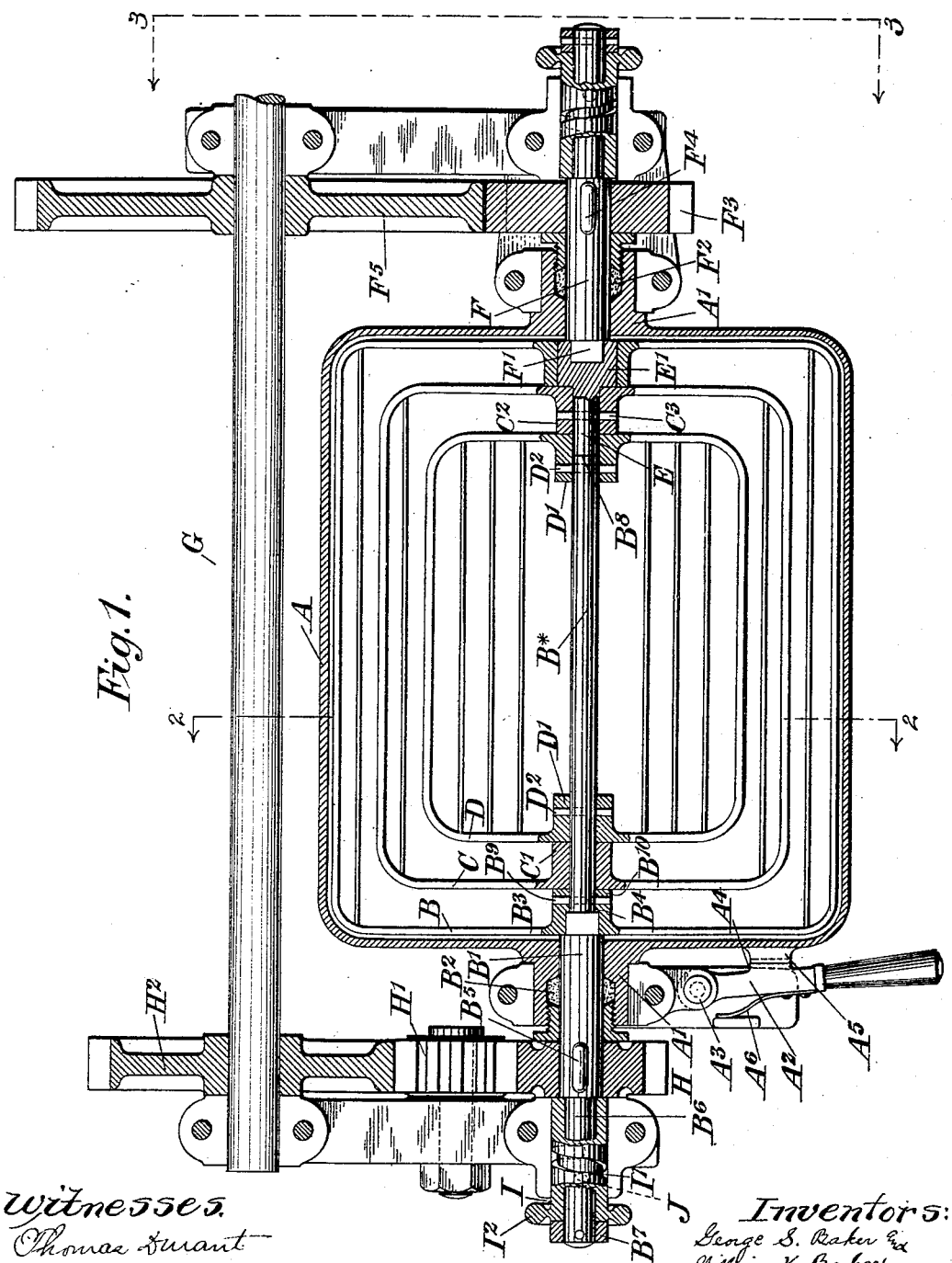
Figure 2:
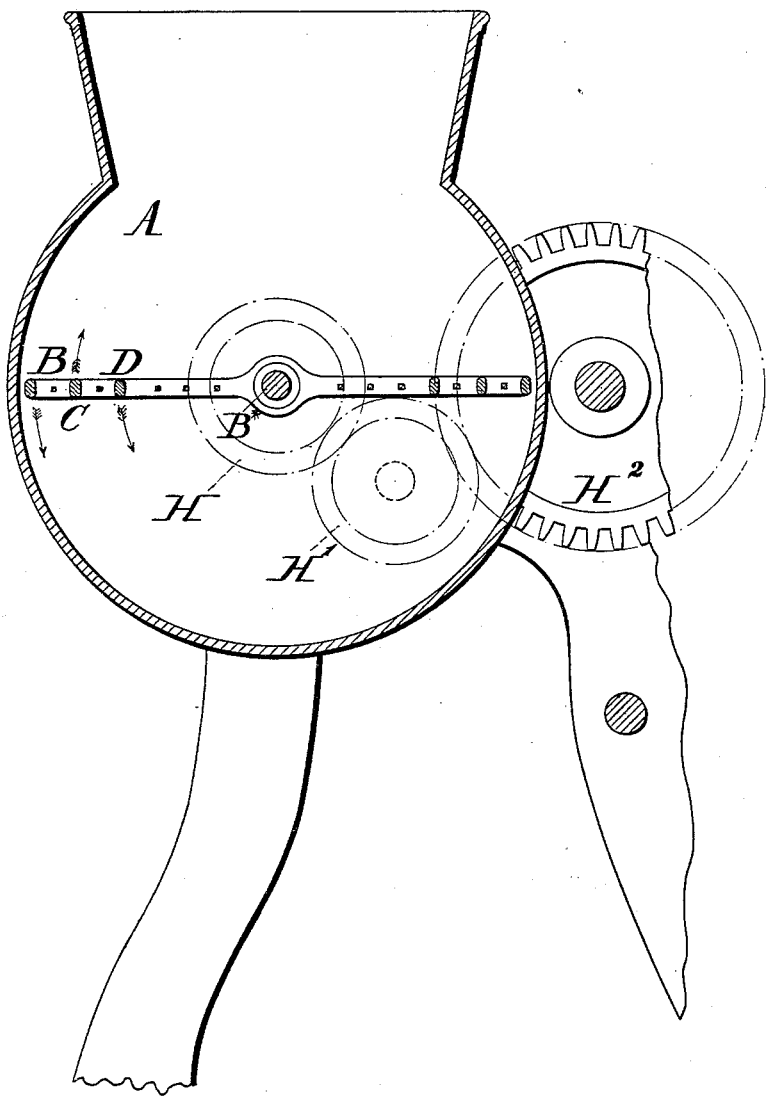
Figure 3:
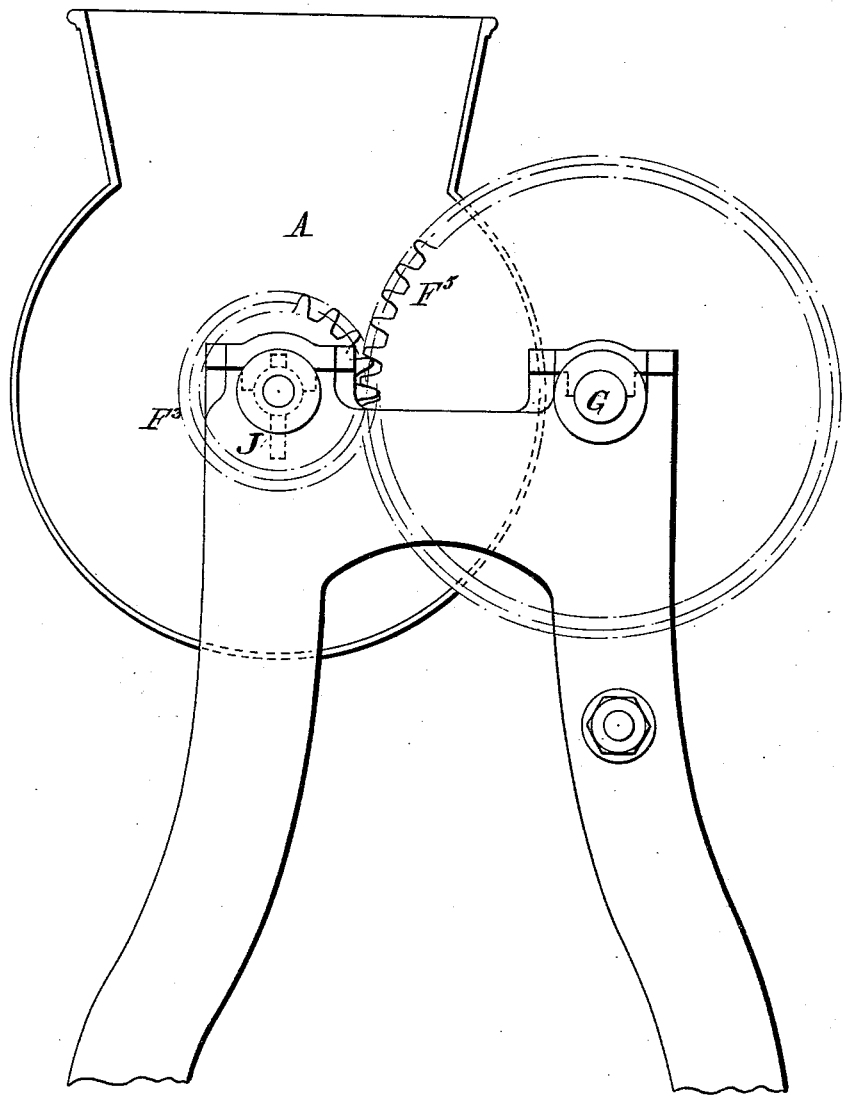
Figure 4:
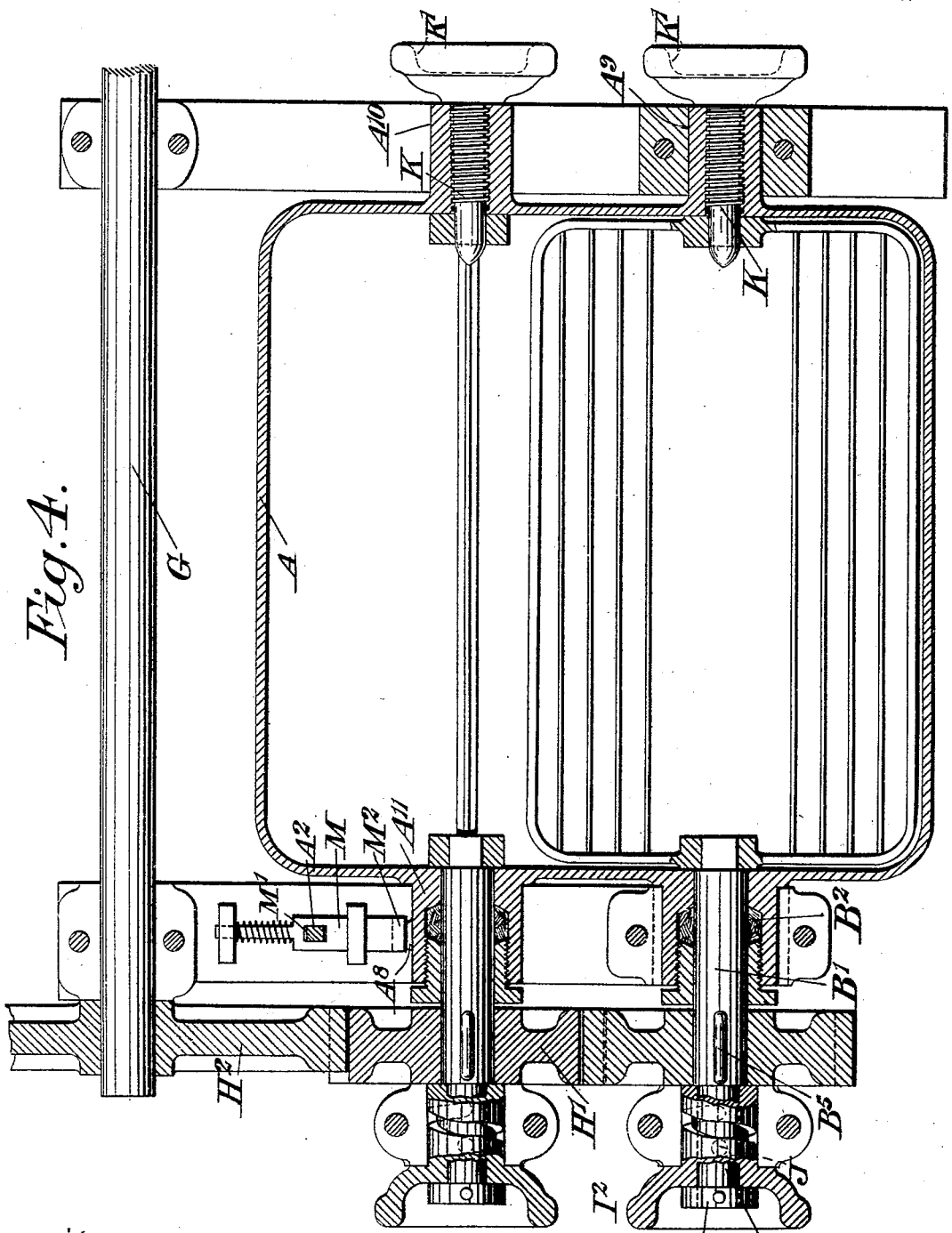
Figure 7:
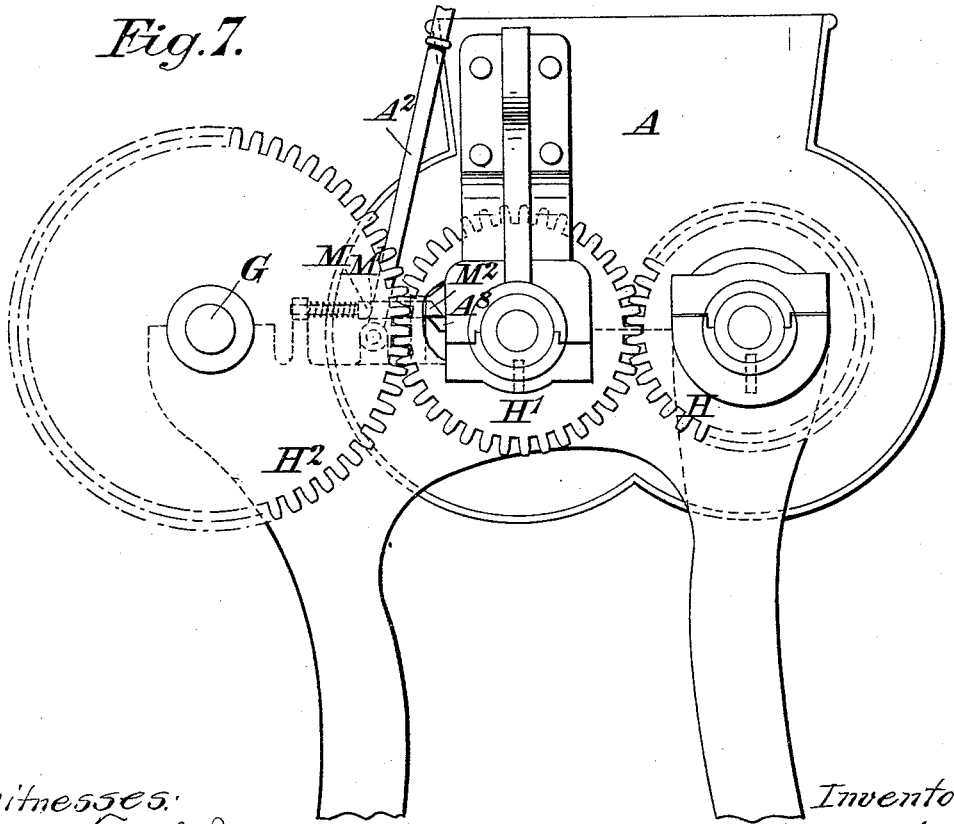
Figure 8:
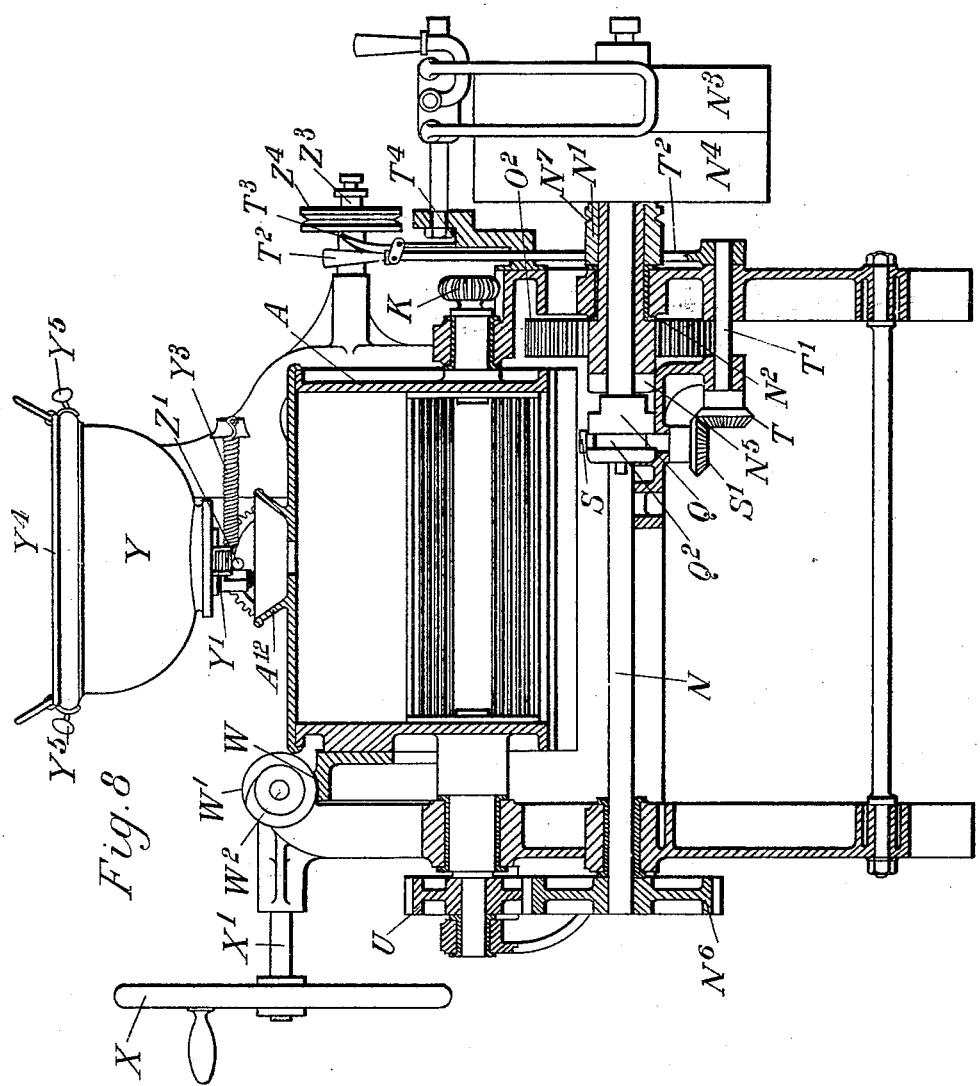
Figure 9:
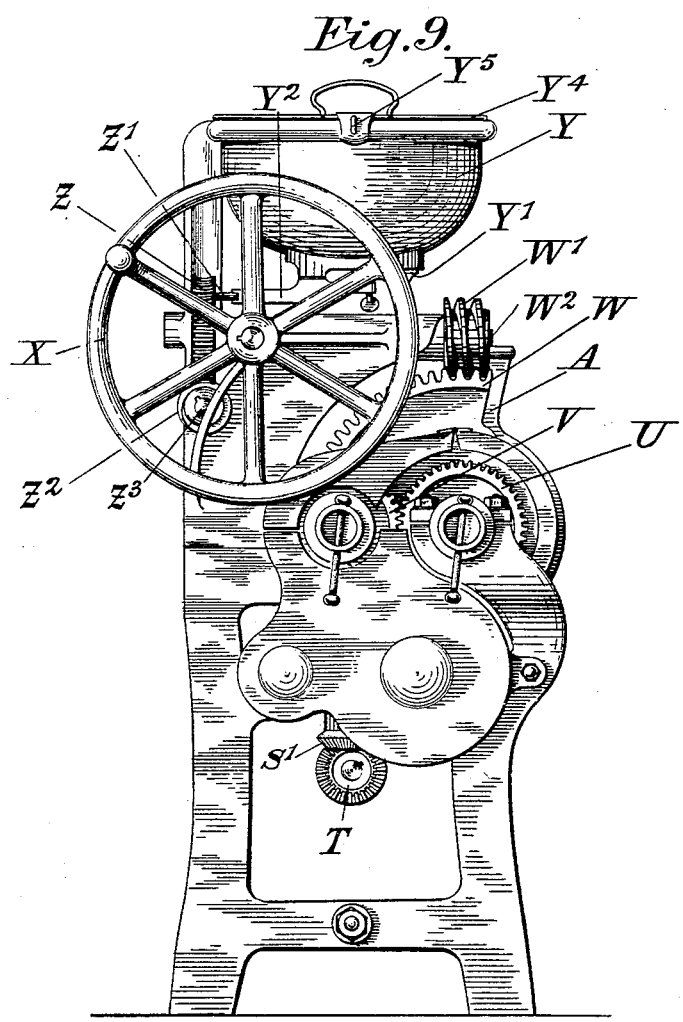

Figure 1 is a sectional plan of the complete apparatus constructed according to this invention, Fig. 2 being a sectional end view on the line 2 2 of Fig. 1, and Fig. 3 an end view looking from the line 3 3 of Fig. 1. Fig. 4 is a plan, and Fig. 5 a sectional end view, of a modification, Fig. 6 being a sectional end view of a further modification. Fig. 7 is an end view looking from the left-hand side of Fig. 4. Fig. 8 is a front sectional elevation of a modified construction. Fig. 9 is an end elevation looking at the left-hand side of Fig. 8. Fig. 10 is a sectional plan of the driving mechanism. Fig. 11 is an end sectional view of the latter on the line 11 11 of Fig. 10, looking in the direction of the arrow.

Like letters represent like parts throughout the drawings.

In the form shown in Figs. 1, 2, and 3, A represents the pan, made of metal or other suitable material, carried upon trunnions $A'$ in the framework of the machine, the framework being of any suitable construction and design. By this means the pan can be tilted for the purpose of emptying the contents, the locking-bar $A^2$, pivoted upon the framework at $A^3$ and having the projection or bolt $A^4$, engaging with the lug $A^5$ (or preferably between two lugs) and pressed therein by the spring $A^6$, serving to hold the pan in position. To release the pan for the purpose of turning it, the locking-bar $A^2$ is withdrawn against the pressure of its spring $A^6$, the bolt $A^4$ being thus released from the lug or lugs $A^5$, when the pan is free to turn upon its trunnions. In this figure three concentric whisks B, C, and D are shown. Of these B and D rotate in the same direction and at the same speed, while C rotates in the opposite direction, preferably at a faster speed. The whisk B is carried upon the shaft $B'$, suitably journaled in the frame and having a stuffing-box $B^2$ to make a tight joint around the shaft. A portion of the shaft is squared at $B^3$, fitting into a square recess in the boss of whisk B, (or the two parts are otherwise arranged so as to turn together, while being capable of being separated,) so that B revolves with the shaft $B'$, which terminates at $B^4$, the boss $D'$ of the whisk D being connected to the shaft $B^\times$, (extending from $B^4$ to $B^8$,)—say by a pin $D^2$—a similar boss $D'$ and pin $D^2$ at the other end of D connecting that end also with the shaft $B^\times$, (whose end at $B^4$ is connected to the whisk B by the pin $B^9$, passing through $B^\times$, and the boss $B^{10}$ of the whisk B,) so that both B and D are connected and driven by the shaft $B'$. The whisk C has its boss $C'$ resting loosely upon the shaft $B^\times$ between the whisks B and D, while at the other end a second boss $C^2$ is connected, as by a pin $C^3$, with a short shaft E, terminating in a head or cup $E'$, having a square socket into which fits the square end $F'$ of the short shaft F, carried in suitable bearings in the framework and provided with a stuffing-box $F^2$. Upon the shaft F is a spur-pinion $F^3$, in which the shaft F can slide, the pinion being carried around with the shaft by the feather $F^4$ or by other suitable means. The spur-pinion $F^3$ is driven by the spur-wheel $F^5$ from the shaft G, which drives the whole apparatus, receiving its power by belt and pulleys or otherwise. Thus it will be seen that the wheel $F^5$ drives the pinion $F^3$, the shaft F through its squared end $F'$ turning the short shaft E, which carries one end of the whisk C and drives it, while the shaft $B'$ carries and drives the two whisks B and D in the opposite direction to the whisk C. The shaft $B'$ is driven by the spur-pinion H, with which gears a similar pinion or idle wheel H', driven in its turn by the spur-wheel H², carried by the shaft G, the object of the idle wheel H' being to reverse the motion of the shaft B', and thus cause the whisks B and D to revolve in the opposite direction to that of the whisk C. Other gearing, however, may be employed for this purpose.

It will be seen that if the square F' of the shaft F and the square B³ of the shaft B' be withdrawn from their respective sockets the whole of the three whisks can be lifted out of the pan for cleaning, giving access to the pan, or for other purposes. This is effected in the following manner: The shaft B' is free to slide in the spur-pinion H, being carried round therewith by the feather B⁵, the sliding movement being imparted by the sleeve I, carried upon the reduced portion B⁶ of the shaft B' and retained by the collar B⁷ upon the end of the shaft B⁶. The sleeve I has formed in its outer periphery or surface a spiral or similar groove I', with which engages a stud or projection J, fixed in the framework of the machine. The sleeve has a hand-wheel I² or equivalent device by which it can be turned, and it will be readily seen that when the sleeve is turned the fixed stud J, engaging in the spiral groove I', causes the sleeve as it revolves to travel inward or outward, according to the direction in which it is revolved, taking with it the shaft B', and either withdrawing it from the squared socket in the whisk B or replacing it in that socket. The shaft F at the other end of the machine is operated by similar means and in a similar manner, so that the whisks can be easily removed and replaced.

The positions of the groove I' and stud J can be reversed, the projection being upon the sleeve and the recess in the framework or bearing, or an ordinary or special screw-thread can be employed. If desired, we may couple the two grooved sleeves together, so that they may be simultaneously operated.

In the modification shown in Fig. 4 the same arrangements for withdrawing the axles at one end of the machine by means of the helical sleeve-stud and hand-wheels are adopted; but as in this case only one whisk is carried upon each shaft, the whisks lying in separate vertical planes, the whisks are carried at their other ends upon screwed studs or centers K, Fig. 4, screwing into bosses A⁹ and A¹⁰ upon the outside of the pan A. These studs may be operated by hand-wheels K' upon their outer ends, the object in both cases being the same—viz., to withdraw the supporting-shafts so as to allow of the whisks being withdrawn.

Figure 5:
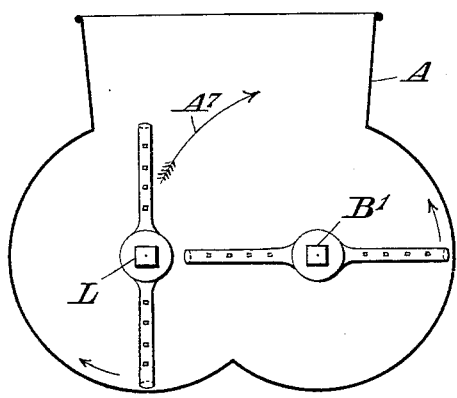

In the arrangement shown in Figs. 4 and 5 the whisks are carried in the same horizontal plane, but in separate vertical planes, and are driven by gearing at the same speed, but are set with their working faces at right angles to each other, so that when one whisk lies horizontally the other lies vertically, and they are thus prevented from touching or interfering with each other. The gearing by which this is accomplished is substantially the same as that shown in Figs. 1 and 2, excepting that the two spur-pinions H and H' lie in the same horizontal plane. They are driven by the spur-wheel H², as previously described, and the whisks revolved in opposite directions. The arrangement of the gearing is clearly shown in Fig. 7. The pan A may be tilted, as before, around the axis B', the bearings of the second whisk in Fig. 4 being carried by the pan, so that it can be lifted with the pan when the latter is tilted in the direction of the arrow A⁷, Fig. 5, for the purpose of emptying the contents, the axle L of Fig. 5 moving in a circular arc about the center B'.

Figure 6:
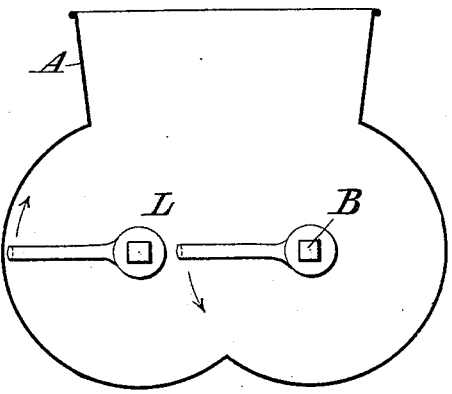

Fig. 6 is in most respects the same as Figs. 4 and 5; but each whisk instead of projecting upon both sides of its axle projects upon one side only, their proper relative positions being insured by gearing similar to that employed in Fig. 1, and the pan tilting as described with reference to Fig. 5.

The end view, Fig. 7, shows the arrangement of the gearing adopted in Figs. 4, 5, and 6. The locking of the pan A is accomplished in the manner already described with reference to Fig. 1; but for convenience a spring-controlled sliding locking-bolt M, carried on the framework of the machine, is employed, through an opening M' in which the locking-bar A² passes. The point M' of the bolt M engages with a projection A⁸ upon the boss A¹¹ of the pan A. The operation of the locking device is the same as that already described in reference to Figs. 1 and 2.

In the alternative construction shown in Figs. 8 to 11 a more compact method of gearing the machine and of tilting the body of the machine for the purpose of discharging the contents is adopted. In this modification a device for dropping eggs or other materials intermittingly into the body of the machine is added. The main driving-shaft N is placed beneath the body of the machine, running longitudinally, and beside this and parallel with it is a second motion-shaft O. The end of the shaft N runs in a sleeve N', upon which is mounted a pinion N² and fast and loose pulley-wheels N³ and N⁴. The shaft N also carries a clutch member Q, which rotates with the shaft owing to the feather Q', but can be moved longitudinally, so as to be engaged with or disengaged from the other portion of the clutch N⁵ upon the end of the sleeve N'. The end of the shaft O passes through a sleeve O', upon which is keyed a toothed wheel O², the sleeve being formed at one end with a clutch member O³, with which can engage the clutch member R. The latter, owing to the feather R', rotates with the shaft O, but can be moved longitudinally thereon. The toothed wheel O² gears with the pinion N², both being continually rotated as long as the driving-belt rests upon the fast pulley N⁴. A two-armed lever S engages at its ends with annular grooves Q² R² in the cluthes Q and R, respectively. The lever S is pivoted about its center upon a shaft S', upon the lower end of which is a bevel-wheel S². The latter gears with a bevel-wheel T, mounted upon a shaft T', which carries upon its end a hand-lever T². This lever is provided with a spring-detent T³, which can be caused to engage with a toothed quadrant T⁴. By moving the lever T² the shaft T' will be partially rotated, and consequently the shaft S', with the result that the lever S will be moved one way or the other, so as to throw one of the clutches R and Q into engagement with one or the other of the sleeves N' O', and thus cause either the shaft O or the shaft N to be driven direct from the driving-sleeve N'. The shaft O carries at the end opposite to that which carries the sleeve O' a pinion O⁴, which engages with a toothed wheel N⁶ on the corresponding end of the shaft N. When the lever T² is moved so as to throw the clutch R into gear with the sleeve O', the shaft N, and consequently the toothed wheel N⁶, will be rotated with a slow movement; but if the clutch Q is thrown into engagement with the sleeve N' the toothed wheel N⁶ will rotate with and at the same speed as the sleeve N'.

For certain classes of cake it is necessary after the butter and sugar have been beaten up together (or creamed) to add the necessary eggs gradually, so as to make a light mixture and to prevent its curdling. For this purpose upon the top of the casing A is formed a bowl A¹², with an opening in the bottom leading into the casing. Above this bowl is mounted on a suitable support a bowl Y, in the bottom of which is an orifice which is closed by a sliding shutter Y', carried upon the end of a pivoted arm Y². The end of this arm lies adjacent to the face of a toothed wheel Z. A pin Z' upon the face of this wheel is so arranged that as the wheel rotates this pin will come in contact with the end of the arm Y² and move the latter, and consequently the slide Y', so as to open the orifice at the bottom of the bowl Y for a brief space, sufficient to allow a small quantity of the contents of the bowl Y to pass into the bowl A¹² and thence into the casing A, where it is mixed with the materials already placed therein. The slide Y' is controlled by the spring Y³, so that as soon as the pin Z' has passed the slide will be brought back to its normal position, so as to close the opening in the bottom of the bowl Y. The toothed wheel Z gears with a worm Z² on a shaft Z³, which carries a pulley-wheel Z⁴, around which passes a band, (not shown in the drawings,) which also passes around an annular groove N⁷ on the sleeve N'. The bowl Y has a lid Y⁴, which can be clamped in position by screws Y⁵. When the mixture is complete, the body or drum of the machine may be tilted upon its trunnions and the contents discharged into a vessel prepared for its reception, as in the other construction. In this modification the tilting is accomplished by the following mechanism: Upon the end of the casing A is mounted a segmental rack W, with which engages a worm W', carried upon a shaft W². With this worm meshes a bevel-gear carried by a shaft X', which latter is rotated by means of the hand-wheel X.

The whisks are removably mounted in the casing A in the manner shown and described above with reference to the construction illustrated in Fig. 4.

The shafts carrying the whisks are provided at one end with toothed wheels U and V, meshing together, the former of which meshes also with the toothed wheel N⁶, the whisks being arranged in this construction as in the construction illustrated in Fig. 5.

We claim—

1. In a whisking or mixing machine, the combination of a casing, beaters removably mounted within the casing, mechanism for rotating the beaters in opposite directions, mechanism for tilting the casing while the beaters are in operation and mechanism for intermittently introducing material into the casing as set forth.

2. In a whisking or mixing machine, the combination of a casing, beaters mounted within the casing, mechanism for rotating the beaters and mechanism for introducing material into the casing.

3. In a whisking or mixing machine, the combination with the casing, beaters mounted within the casing, mechanism for rotating the beaters at different rates of speed, and mechanism for introducing material into the casing.

4. In a whisking or mixing machine, the combination with the casing, of the beaters mounted therein, the longitudinally-movable shafts journaled in the side of the casing having the squared ends for engaging the hubs of the beaters, the sleeve carried by the shaft having the spiral groove therein, the pin on the casing engaging said groove, and the hand-wheel for turning said sleeve, whereby as the sleeve is turned, the shaft will be moved; substantially as and for the purpose set forth.

5. In a whisking or mixing machine, the combination with the casing having the opening in the top thereof, the beaters mounted in said casing, the bowl or hopper suitably supported above the casing and having an opening in the bottom, the slide for closing said orifice and mechanism for operating said slide intermittently, whereby the contents of the bowl may be discharged into the casing; substantially as described.

6. In a whisking or mixing machine, the combination with the casing having the opening in the top, the beaters mounted in the casing, the bowl or receptable suitably mounted above the casing, having the orifice in the bottom thereof, the slide for closing the orifice, carried upon the pivoted arm, the wheel carrying the pin adapted to strike the arm and move the slide, and means for turning the wheel, and the spring for returning the slide to close the orifice in the bowl; substantially as and for the purpose set forth.

In testimony whereof we have hereto set our hands in the presence of the two subscribing witnesses.

GEORGE SAMUEL BAKER.
WILLIAM KING BAKER.

Witnesses:
ALFRED J. BOULT,
HARRY B. BRIDGES.